US011486771B2

(12) United States Patent
Rogge et al.

(10) Patent No.: US 11,486,771 B2
(45) Date of Patent: Nov. 1, 2022

(54) SENSOR HAVING A PRESSING RESILIENCE

(71) Applicant: TDK Electronics AG, Munich (DE)

(72) Inventors: Clemens Rogge, Berlin (DE); Carsten Dehoff, Berlin (DE)

(73) Assignee: TDK Electronics AG, Munich (DE)

( * ) Notice: Subject to any disclaimer, the term of this patent is extended or adjusted under 35 U.S.C. 154(b) by 351 days.

(21) Appl. No.: 16/651,902

(22) PCT Filed: Sep. 18, 2018

(86) PCT No.: PCT/EP2018/075202
§ 371 (c)(1),
(2) Date: Mar. 27, 2020

(87) PCT Pub. No.: WO2019/063364
PCT Pub. Date: Apr. 4, 2019

(65) Prior Publication Data
US 2020/0264053 A1   Aug. 20, 2020

(30) Foreign Application Priority Data

Sep. 28, 2017 (DE) .......................... 102017122597.8

(51) Int. Cl.
*G01K 7/22* (2006.01)
*G01K 1/14* (2021.01)

(52) U.S. Cl.
CPC ............... *G01K 7/22* (2013.01); *G01K 1/14* (2013.01)

(58) Field of Classification Search
CPC .................................. G01K 7/22; G01K 1/14
See application file for complete search history.

(56) References Cited

U.S. PATENT DOCUMENTS

| | | | | |
|---|---|---|---|---|
| 4,355,912 A | * | 10/1982 | Haak | G01K 1/14 374/208 |
| 4,558,959 A | | 12/1985 | Thomas | |
| 4,866,410 A | * | 9/1989 | Deppe | G01K 7/16 374/E7.018 |
| 5,061,083 A | * | 10/1991 | Grimm | G01K 1/08 374/112 |
| 6,220,749 B1 | * | 4/2001 | Wyker | G01K 1/14 374/208 |
| 6,227,703 B1 | | 5/2001 | DiMatteo | |

(Continued)

FOREIGN PATENT DOCUMENTS

| CN | 101650234 A | 2/2010 |
|---|---|---|
| CN | 203396499 U | 1/2014 |

(Continued)

OTHER PUBLICATIONS

JPS59132135, Numata et al., machine translation. (Year: 1984).*

(Continued)

*Primary Examiner* — Kyung S Lee
(74) *Attorney, Agent, or Firm* — Nixon Peabody LLP

(57) ABSTRACT

A sensor for measuring a parameter at a measurement point of a surface by means of direct contact. The sensor includes a sensor element arranged movably in the sensor and a spring element that can resiliently absorb an application force with which sensor element is pressed against the measurement point.

11 Claims, 3 Drawing Sheets

(56) References Cited

U.S. PATENT DOCUMENTS

| | | | | |
|---|---|---|---|---|
| 8,337,081 | B1* | 12/2012 | Holmberg | F24H 1/181 |
| | | | | 374/121 |
| 8,491,184 | B2* | 7/2013 | Kamen | G01N 25/18 |
| | | | | 73/863.61 |
| 9,228,084 | B2* | 1/2016 | Inokawa | C08K 3/04 |
| 9,302,306 | B2* | 4/2016 | Matsumoto | B21D 37/16 |
| 10,768,054 | B2* | 9/2020 | Lyon | H01R 13/111 |
| 10,777,944 | B2* | 9/2020 | Wirnitzer | H01R 13/6683 |
| 2008/0212645 | A1* | 9/2008 | Mau | G01K 1/16 |
| | | | | 374/E1.019 |
| 2008/0216580 | A1* | 9/2008 | Kuznia | G01L 23/24 |
| | | | | 73/714 |
| 2010/0040112 | A1 | 2/2010 | Huck et al. | |
| 2017/0210206 | A1 | 7/2017 | Dienhart et al. | |
| 2017/0268935 | A1 | 9/2017 | Hua | |
| 2017/0288346 | A1* | 10/2017 | Wirnitzer | G01L 19/144 |

FOREIGN PATENT DOCUMENTS

| | | |
|---|---|---|
| CN | 106994880 A | 8/2017 |
| DE | 000G0013165 MAZ | 11/1953 |
| DE | 4427558 A1 | 11/1998 |
| DE | 10201700683 A1 | 7/2017 |
| DE | 102017200683 A1 | 7/2017 |
| EP | 0404310 A2 | 6/1994 |
| EP | 2241870 A1 | 10/2010 |
| JP | S59-132135 U | 9/1984 |
| JP | H03-237923 A | 10/1991 |
| JP | H07-159248 A | 6/1995 |
| JP | H08-94453 A | 4/1996 |
| JP | H08-166296 A | 6/1996 |
| JP | 2013-164265 A | 8/2013 |
| JP | 2016004611 A | 1/2016 |
| JP | 2017-102048 A | 6/2017 |
| JP | 2017-525979 A | 9/2017 |
| JP | 2019-074327 A | 5/2019 |

OTHER PUBLICATIONS

"THERMA," Thermofuehler GmbH, Published <URL: https://www.therma-shop.de/de/shop/section/products_detail/motorsport/sensoren-fuer-reifen-bremssystemem/-/-/-/-/schleiffuehler.html/> [retrieved Apr. 24, 2020].

International Search Report and Written Opinion in International Application No. PCT/EP2018/075202, dated Dec. 6, 2018 (9 pages).

Patent Office of the People's Republic of China, Search Report in Chinese Patent Application No. 201880063294.9 dated Jun. 7, 2021, with English translation (9 pages).

* cited by examiner

SENSOR HAVING A PRESSING RESILIENCE

CROSS-REFERENCE TO RELATED APPLICATIONS

This application is a U.S. National Stage of International Application No. PCT/EP2018/075202, filed Sep. 18, 2018, which claims the benefit of Germany Patent Application No. 102017122597.8, filed Sep. 28, 2017, both of which are incorporated herein by reference in their entireties.

The invention relates to a sensor, in particular to a temperature sensor, which during the measurement is brought in direct contact with a surface to be measured. In order to establish an intimate thermal contact, an application pressure onto the surface is required.

In various technical components, the problem arises that evaluation and monitoring electronics belonging to the component are reliant on temperature measurement values of the surfaces to be monitored. If the components comprise moving parts, are subject to a movement in space or even only vibrate, relative movements between the sensor and the component surface to be monitored may occur. On a vehicle, for example, there may be vibrations which can put at risk reliable contact of the sensor element with the surface.

In order to absorb such vibrations, either secure fastening of the sensor on the surface to be measured is required, or the fastening is configured resiliently so that the fastening or the sensor itself can absorb a vibration without being damaged and without thereby losing the intimate contact between the sensor and the surface to be measured. Furthermore, for example, monitoring of the temperature of a surface requires an application force that remains constant and which must be maintained throughout the lifetime of the component.

In movable components, or components which are installed in mobile devices or units, the problem furthermore arises of configuring the sensor for the smallest possible installation space.

One example of the use of such a sensor involves, for example, evaluation and monitoring electronics for battery or current conductor surfaces, particularly in electrically driven vehicles such as e-bikes or other e-mobility vehicles.

In known solutions, temperature sensors are pressed with the aid of an elastomer part onto the surface to be measured. This solution has the disadvantage that aging of the elastomer takes place, for example by the effect of UV, alternating temperature loads, excessively high or low temperatures, so that the adjusted application force varies or weakens because of aging. Since, in particular, the thermal transfer coefficient is also dependent on the application force, changing application forces lead to temperature values differing from the true values. Variations occur, which may lead to discrepancies. Furthermore, the response times of the sensor may vary as a function of the operating and aging state of the sensor. A further problem is that integration of the measurement lines of the sensor into the cable harnesses of electrically operated vehicles is labor-intensive and expensive, so that manual organizing of the connections and in particular plugs is often necessary.

It is therefore an object of the present invention to provide a sensor which avoids the disadvantages mentioned above. In particular, the intention is to provide a sensor which straightforwardly makes a constant application pressure available and maintains this almost without change even in the event of aging. It is a further object to facilitate the installation of the sensor into a given system, for example an electrically operated vehicle.

Claim 1 provides a sensor which achieves at least some of the objects mentioned. Advantageous configurations of the sensor are specified in further claims.

The sensor is configured for measuring a physical parameter at a measurement point on a surface by means of direct contact. It comprises a sensor element arranged movably in the sensor. It furthermore comprises a spring element which can resiliently absorb an application force with which the sensor element is pressed against the measurement point. By the combination of the sensor element which is movable in the sensor and the application force provided by the spring element, a system is obtained with which a constant application pressure can be set up. The latter can also absorb relative movements between the surface and the sensor within the scope of the spring elasticity of the spring element, without the application pressure weakening or the position of the measurement point being displaced.

The proposed sensor is then no longer reliant on being pressed with the aid of a pressure pad consisting of elastomeric plastic against the surface, and is therefore also not dependent on aging thereof. The spring element is a mechanical element, which may be configured to be stable in the long term while not losing its spring action even in the event of different deflections. In contrast to known solutions, in this case a varying distance between the measurement point and the sensor is compensated for by the movable sensor element itself. The sensor is configured in such a way that an adjusted minimum application force is not fallen below when relative movements lying within the expected scope occur.

According to one embodiment of the invention, the sensor comprises a base plate, which comprises connection pins. A cover cap is seated on the base plate. The base plate and the cover cap form a housing, in which a carriage is fastened by means of the spring element with a prestress in such a way that the carriage and the sensor element arranged thereon can move against the prestress in the direction of the base plate. The sensor element is fastened on the carriage and is electrically connected via bonding wires to the connection pins on the base plate. The electrical connection of the sensor to an external circuit environment may furthermore be carried out via the base plate.

In order to carry out a measurement, the sensor is pressed against a measurement point onto a surface to be measured, the carriage with the sensor element being moved against the spring action of the spring element in the direction of the base plate, so that a restoring force is created.

The spring element may also be under a prestress in the neutral position of the sensor, when it is not pressed against a measurement point. This prestress may be adjusted by compression of the spring element.

In an alternative solution, the prestress is produced by expansion of the spring element.

In a third embodiment, the spring element does not differentiate between expansion and compression, and is instead moved out from its initial position by the relative movement between the carriage and the base plate. In this case, as a function of the degree of deflection, a restoring force which acts against the deflection is set up.

Even in a neutral position (without additional deflection), the spring element has a prestress, so that the desired restoring force can already act even with a very small deflection from the neutral position.

According to one embodiment, the deflection of the carriage for adjusting the prestress of the spring element is greater than the relative movement to be expected, so that an application pressure can always be obtained.

The housing is used on the one hand to protect the carriage, sensor element and spring element against external influences, and on the other hand is used to hold and guide the carriage.

In one embodiment, the cover cap comprises a guide, in which the carriage is guided in such a way that it can move exclusively in the direction of the base plate and back. Such a guide may be configured as a guide rail in which a corresponding projection on the carriage engages. As an alternative, a guide configured as a rail may also be provided on the carriage and the corresponding projection on the housing, for example on the cover cap.

In one advantageous embodiment, the spring element is configured as a leaf spring. The latter has two ends, which protrude laterally from the carriage. With the two ends, the leaf spring bears on a stop in the housing. The stop is located between the leaf spring and the base plate, so that as a result of movement of the carriage in the direction of the base plate, the leaf spring comes in contact with the stop and, with further movement, is deflected in the direction of the base plate.

In one embodiment, the carriage comprises a sleeve having a closed end. The sensor element is fitted, or arranged, and fastened in said sleeve. With the closed end, the sleeve is fed through an opening in the cover cap and therefore points away from the base plate.

The closed end with the sensor element therein essentially represents the sensor head by means of which the parameter to be measured, in particular the temperature to be measured, is determined. Accordingly, the sleeve comprises a thermally highly conductive material in order to ensure good heat transfer from the measurement point on the surface to the sensor element.

In one embodiment, the sleeve is made of a metallic material, for example of aluminum. On the outer and/or inner surface, the sleeve may be provided with an electrically insulating coating, in the case of aluminum for example with an oxide layer. It is therefore possible to measure even at measurement points which have an electrical potential difference in relation to the sensor, without hazardous sparking back or over taking place.

Simple assembly of the housing is achieved in one embodiment in a purely mechanical way by putting the cover cap on the base plate. To this end, the cover cap may comprise latch elements which can latch into corresponding recesses of the base plate during assembly of the housing and then also are latched in the assembled state.

A preferred latch element is a latching lug which can latch on a protruding edge of the base plate. It is naturally also possible to provide latch elements on the base plate and have these latch in the cover cap. In order to permit better accessibility of the base plate, and in particular of the connection pins, the base plate may be configured in a planar fashion except for the connection pins, in order to allow better and simpler fastening of the bonding wires on the connection pins.

One advantageous embodiment uses connection pins which are pressed into the base plate without solder. Since a connection pin advantageously comprises a possibility of connection for the bonding wires of the sensor element and a possibility for outward connection to a circuit environment, the connection pins advantageously pass through the base plate and thus comprise a section pointing inward and a section pointing outward. With the outwardly pointing section, the sensor may be connected to the circuit environment and, for example, likewise be fitted without solder into a printed circuit board or another circuit environment.

In one preferred application, the sensor element is as a temperature sensor based on an NTC element (NTC=negative temperature coefficient). NTC temperature elements are wired by nature and comprise an encapsulated head. It may, however, also be configured as a thermocouple or as an ohmic resistor element.

In the proposed sensor, the sensor element, or its head, is fitted in the sleeve and encapsulated there with an encapsulation compound. In this case as well, the encapsulation compound is advantageously selected in such a way that good thermal transmission can take place, so that thermally highly conductive encapsulation compounds are preferred. The thermal conductivity may be increased by thermally conductive fillers in the encapsulation compound.

For technical reasons, the stop for the leaf spring must be located at a distance from the base plate which corresponds at least to the maximum deflection path of the carriage plus the height with which the carriage itself protrudes beyond the fastening position of the leaf spring. In order to provide such a height above the base plate, in one embodiment a spacer ring is inserted between the cover cap and the base plate, in such a way that the spacer ring forms a segment of the housing. The stop for the leaf spring may then be formed on the lower end of the spacer ring in the direction of the sensor head.

Fastening of the spacer ring is achieved in a straightforward way with the aforementioned latch elements by the latter engaging through the spacer ring and engaging into the corresponding recesses in the base plate, so that the spacer ring is clamped between the base plate and the cover cap and is therefore fastened firmly.

In particular, the spring element configured as a leaf spring absorbs relative movements between the sensor element and the sensor. In addition, the bonding wires of the sensor element are curved in order to compensate for the corresponding relative movement with a deformation reserve. Preferably, the bonding wires fed out parallel to one another at a short distance from the sensor element are laterally curved outward, so that there is a T-shape or Y-shape for the overall geometry of the bonding wires.

For the component parts of the housing, as well as for the carriage and for the base plate, plastics which can be produced in a straightforward way by means of injection molding are preferred as materials. In order to adjust desired properties, the plastics may be filled with fillers.

The invention will be explained in more detail below with the aid of exemplary embodiments and the associated figures. The figures are in part rendered purely schematically and serve only for improved illustration of the invention. Some parts may in this case be represented with a smaller or greater size, so that the representations are not true to scale.

FIG. 1 shows schematic embodiments of sensors with slightly different functional principles in cross section, FIG. 2 shows exemplary guides of a carriage in the housing with the aid of a schematic cross section, FIG. 3 shows a spring element configured as a leaf spring together with stops in the housing, FIG. 4 shows a perspective view of a sensor with a sleeve, which is fed through an opening in the housing, FIG. 5 shows two examples of the connection of the cover cap and the base plate by means of latch elements, FIG. 6 shows a possible connection of the bonding wire to the connection pins, FIG. 7A shows an exploded representation of the various sensor components, and FIG. 7B shows an exemplary embodiment of an assembled sensor in perspective cross section.

FIGS. 1A to 1C show simple embodiments of a sensor according to the invention with the aid of schematic cross-sectional representations. The sensor comprises a sensor element SE, which is firmly connected to a carriage SC. This carriage is movable in the sensor SR, for example suspended in a housing GH and coupled by means of spring elements FE to the sensor property right/housing GH, in such a way that the spring elements FE can resiliently absorb an application force of the sensor element, or carriage SC, SE. The direction of the deflection of the carriage SC is indicated by an arrow AL, while the respective arrows on the spring element represent the deflection of the spring element due to the deflection of the carriage SC. In the embodiment according to FIG. 1A, extension of the spring elements FE takes place in the direction AL, so that the corresponding restoring force is set up against the deflection AL.

Figure 1A:
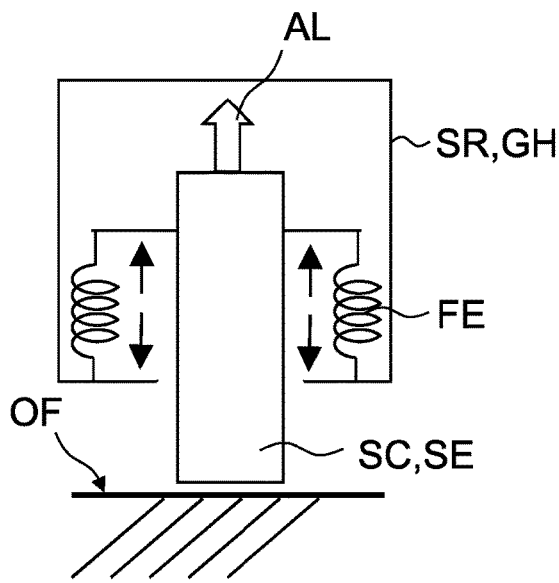
FIG. 1B shows an embodiment in which a deflection in the direction AL leads to a compression of the spring elements FE, represented by the respective arrows parallel to the spring elements. The restoring force is achieved by relaxation of the spring elements.
FIG. 1C shows an embodiment in which a leaf spring as the spring element FE, which abuts on a stop AG in the housing GH, is fastened on the carriage SC. In the event of a deflection of the carriage SC in the direction AL, bending of the leaf spring takes place so that a restoring force is set up.
Figure 1B:
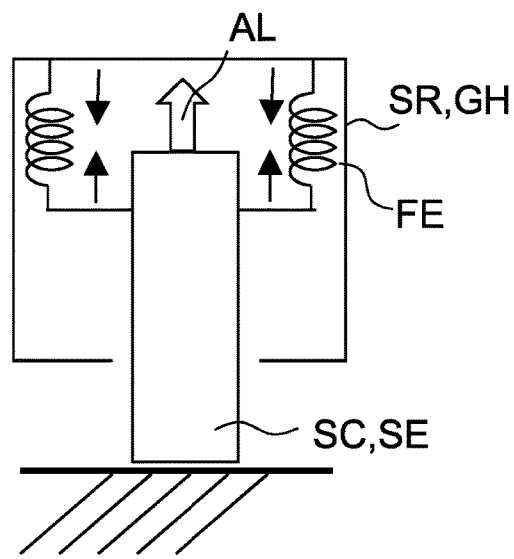
Figure 1C:
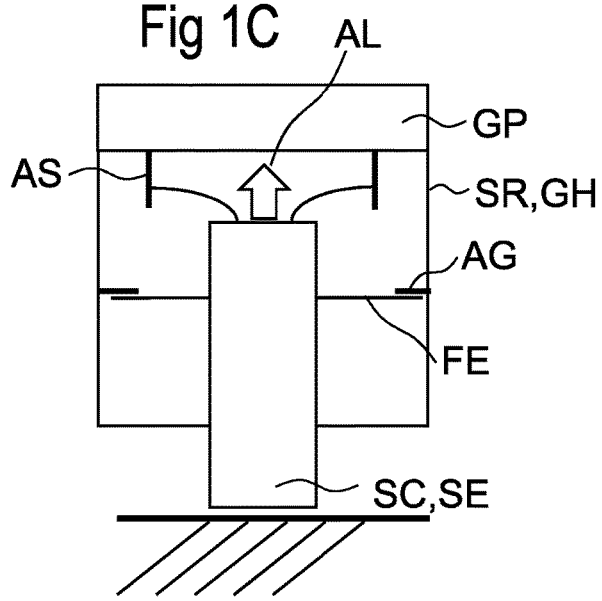

In all three cases represented according to FIGS. 1A to 1C, a deflection of the carriage SC in the direction AL and therefore a deflection of the sensor element SE into the housing is absorbed by a spring element FE which, with its restoring force, ensures pressure of the carriage SC, or of the sensor element SE fastened thereon, onto a surface OF. A measurement point on the surface OF, at which a physical parameter is intended to be determined, is located in the contact region of the carriage SC, or sensor element SE, with the surface OF.

FIG. 1C additionally shows the way in which the sensor element SE may be fastened to connection pins AS by means of bonding wires. The connection pins AS are inserted in a base plate GP, which form the part, represented here at the top, of the housing GH of the sensor SR. Although deformation of the bonding wires BW takes place because of the deflection in the direction AL, they do not per se produce any restoring force. This is left entirely to the spring elements FE.

Figure 2A:
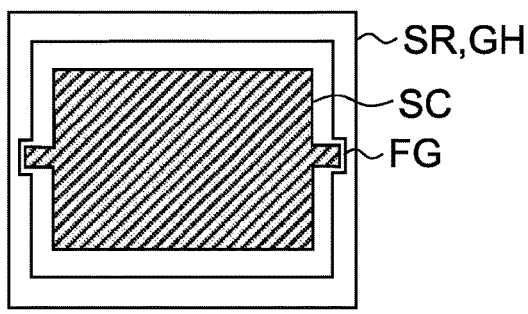
Figure 2B:
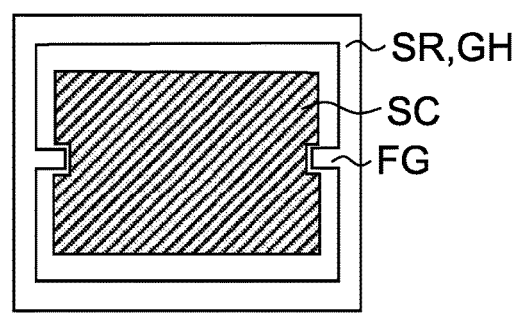

FIGS. 2A and 2B show possibilities of the way in which a carriage SC may be guided inside the housing GH of the sensor SR. To this end, the housing GH comprises a corresponding guide, which in the embodiment according to FIG. 2A is configured as a groove or rail inside the housing GH. A corresponding rib or a projection of the carriage SC engages into this groove. The rail and the projection are oriented parallel to the deflection direction AL.

The sensor advantageously has at least two guides which are arranged on opposite sides of the sensor SR. It is, however, also possible to produce to guide the carriage securely in the sensor housing GH using a higher number of guides.

Figure 3:
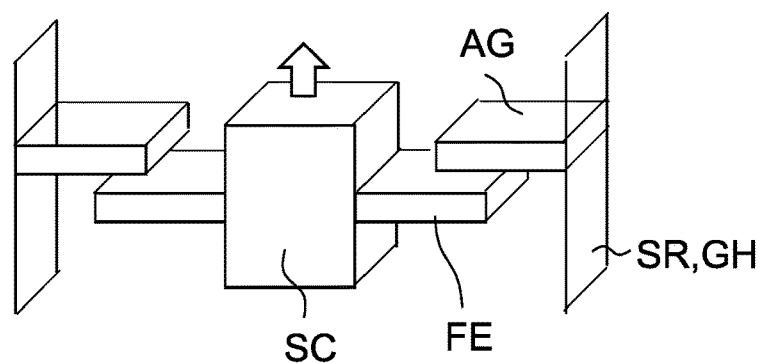

FIG. 3 shows a schematic representation of a carriage with a leaf spring fastened thereon. The carriage SC is pressed against the spring force of the spring element FE configured as a leaf spring into the housing GH of the sensor SR, a corresponding resilient restoring force being set up by deflection of the leaf spring FE, which abuts on the stop AG. The leaf spring FE comprises two ends pointing away from the carriage, which have a small overlap with corresponding stops AG in the housing GH. The overlap is dimensioned to be small enough that a sufficiently large part of the leaf spring can bend between the carriage and the stop, in order to ensure the corresponding restoring force.

Figure 4:
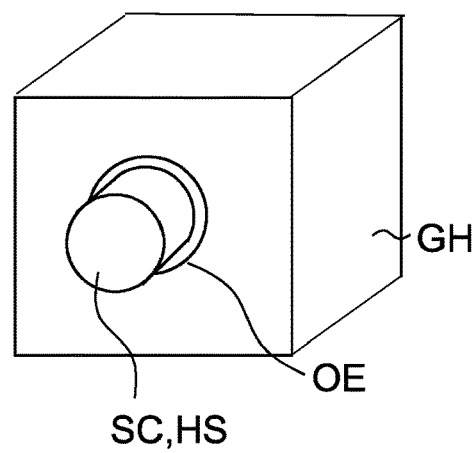

FIG. 4 shows a perspective representation of the way in which the carriage SC can be deployed from the housing GH. A sleeve HS is represented, which is connected to the carriage, or constitutes a part of the carriage. It is fed through an opening OE in a side surface, or lower side, of the housing GH. In the opening OE, the sleeve HS is freely movable in the deflection direction AL, which in this case is the same as the axis vertical to the plane of the sheet.

The housing of the sensor SR may, as described, consist of a base plate GP and a cover cap KP. The usually flatly configured base plate GP may be connected to the cover cap KP by means of latch elements RE, such as are represented in a simple embodiment in FIGS. 5A and 5B. Each latch element RE of the cover cap KP comprises, for example, a latching lug which can latch into a recess RA.

Figure 5A:
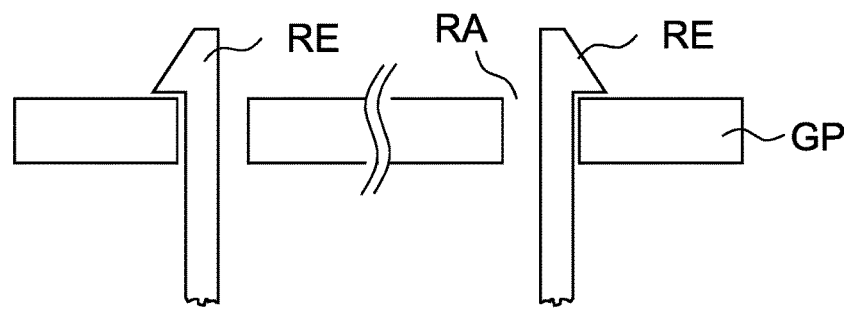
Figure 5B:
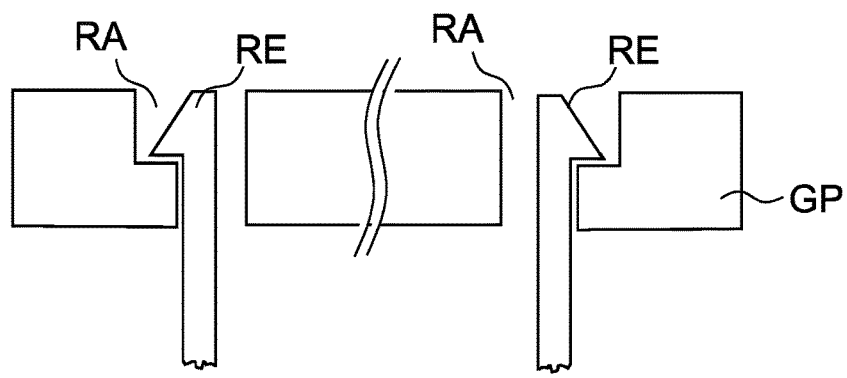

FIG. 5A shows an embodiment in which the recess RA for the latch element RE is configured as a hole in the base plate GP. The latching lug can then latch in above the recess on an edge of the recess RA. FIG. 5B shows an embodiment which is similar but in which the latching in takes place on a lowered step inside the recess RA. This ensures that the latch element RE does not protrude beyond the upper edge of the base plate GP after latching in.

The latch elements RE preferably comprise a chamfered edge on the upper side, so that, when being fitted from below into the recess RA, they are deviated on the lower edge of the recess RA until the latching lug latches inside the recess RA. The driving force for latching the latch elements RE in corresponds to the restoring force of the latch elements RE after the deviation at the chamfered edge. The latch elements RE have sufficient elasticity to allow the deviation and set up the restoring force.

The base plate GP and the cover cap KP may be connected securely to one another by at least two, but preferably four or more, latch elements. Preferably, the cover cap KP is configured in such a way that it bears on the base plate GP from below when the latch elements RE are latched into the recesses RA (this is not represented in the figure).

Figure 6:
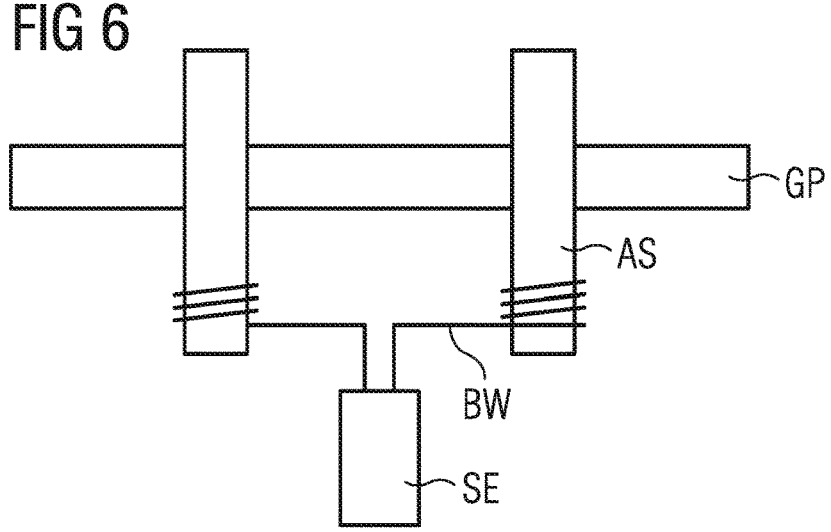

FIG. 6 shows a schematic cross-sectional representation of the way in which the sensor element SE can be fastened by means of bonding wires BW on the connection pins AS, which are inserted in or pass through the base plate GP. The bonding wires BW are preferably wound around the lower end of the connection pins AS and soldered there to the metal connection pins AS. The bonding wires BW are fed out from the sensor element SE initially parallel in their profile, then bent outward before the bent ends are wound around the ends of the connection pins AS. The winding create a sufficient an extension reserve, in order to allow deflection of the sensor element SE relative to the base plate GP and therefore relative to the connection pins AS.

Figure 7A:
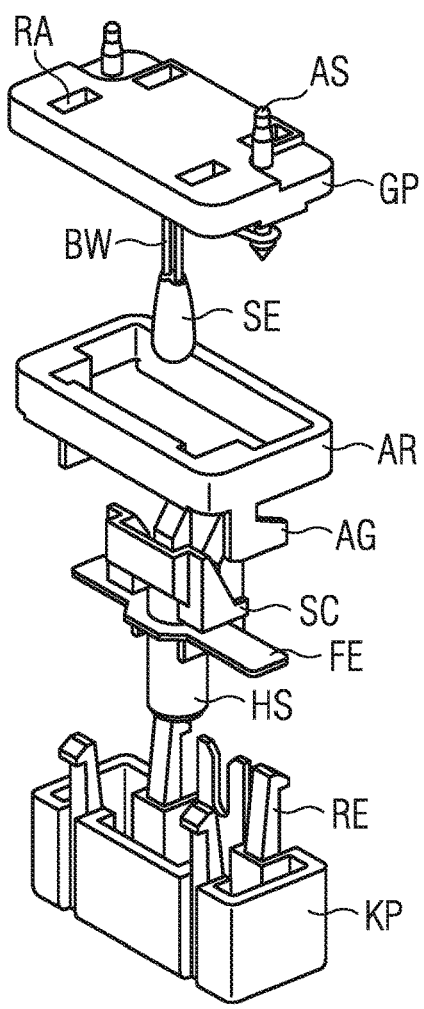

FIG. 7A shows one possible embodiment of a sensor in a geometrically accurate exploded representation, and therefore in a real geometry. The individual parts represented together provide a functional sensor SR. The housing GH of the sensor SR is formed by a base plate GP, a spacer ring AR and a cover cap KP. The cover cap KP comprises latch elements RE, which may be fed through the spacer ring AR into corresponding recesses RA on the base plate GP, in order to be latched there into the recesses RA. In this way, the spacer ring AR is firmly retained between the cover cap KP and the base plate GP.

The sensor element SE is fastened by means of bonding wires BW to the connection pins AS passing through the base plate GP. The sensor element SE, or the bonding wires BW led out therefrom, point vertically away from the base plate, downward in the figure.

As the sensor part which can be moved in the sensor is formed as a carriage SC, which comprises at least one closed sleeve HS into which the sensor element SE together with the bonding wires BW can be fitted. Transversely with respect to the carriage SC, a leaf spring is connected to the carriage SC, the two ends of which laterally protrude from the carriage SC.

After assembly of the housing, i.e. after connection of the cover cap KP to the base plate GP with inclusion of the spacer ring AR, the carriage SC is freely movable in the deflection direction AL in the scope of a certain deflection inside the housing. When the housing is assembled, the ends of the leaf spring FE are pressed against a stop AG, which is preferably formed in the spacer ring AR and is thus positioned over (under) the lower surface of the base plate GP in the finally assembled housing. A second stop AG2 is formed around an opening OE, through which the sleeve is fed through the cover cap KP. With the second stop AG2, when the housing is assembled, the carriage SC is pressed together with its leaf spring against the stop on the spacer ring AR, and thus pre-stressed.

A further increased pre-stress is obtained when the finished sensor SR is pressed against the surface OF to be measured. A deflection of the carriage SC counter to the direction AL is therefore also possible, if this is required because of a corresponding relative movement between the surface and the sensor.

Figure 7B:
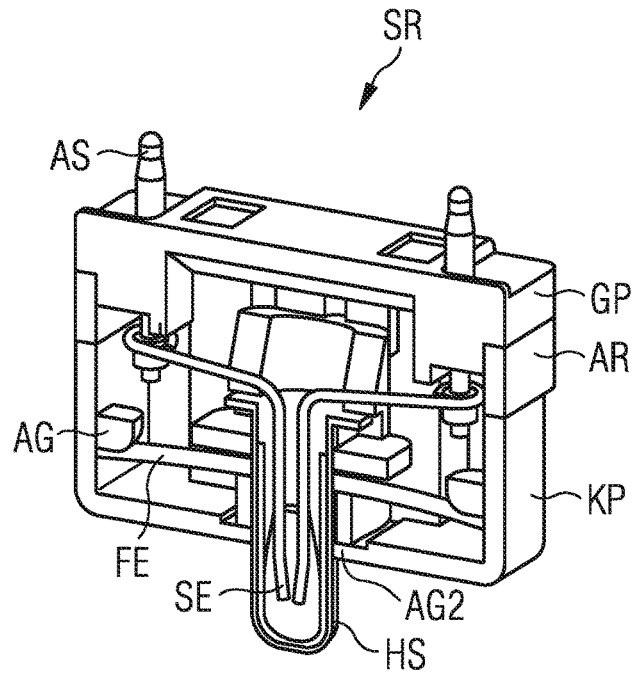

FIG. 7B shows the sensor SR in the assembled state. In the exemplary embodiment shown, the housing of the sensor has dimensions of 20×12, 5×10.4 mm. Without further deflection, the carriage SC is seated on the second stop AG2 and is pre-stressed by deflection of the leaf spring FE on the first stop AG. If the sensor is now pressed with the sleeve HS protruding from the housing, or with the end protruding, against a surface OF and against a measurement point there, the carriage SC can move into the interior of the housing GH in the deflection direction AL. In this case, a further stop on the spacer ring AR or formed by the lower side of the base plate GP may limit a maximum deflection of the carriage.

In one exemplary embodiment, the sensor is dimensioned in such a way that, when the housing GH is assembled, the spring element FE (in this case the leaf spring) experiences a deflection which corresponds to a movement of the carriage in the direction AL of about 0.3 mm. This minimum deflection is meant to be complied with inclusive of installation tolerances. The restoring force is therefore set up in the initial position or neutral position of the sensor SR. When the sensor head (closed end of the sleeve HS) is placed on the surface OF, a further deflection of the carriage takes place up to at most about 2 mm. In the installed state of the sensor, a relative movement of ±0.3 mm may then still take place, which can be absorbed by the sensor without the application pressure being unacceptably reduced.

The sensor element SE is, for example, a conventional temperature sensor based on an NTC thermistor element, which may be encapsulated in the sleeve HS. To this end, for example, a conventional casting resin based on an epoxide or another curable synthetic resin may be used.

The sleeve is preferably made of metal, and may be internally and/or externally electrically insulated. Connection of the sleeve to the carriage SC and to the spring element FE configured as a leaf spring may be carried out during production of the carriage SC by means of injection molding, during which the carriage SC is so to speak molded around the leaf spring and the end of the sleeve.

The stops AG on the spacer ring AR for the leaf spring FE are arranged in such a way that they come to lie below the solder position of the bonding wire on the connection pin in the mounting direction. In this way, it is possible to configure the housing with only a small height.

The connection pins AS are preferably press-in contacts, which may have a harpoon shape. With the aid of the harpoon shape, they may be pressed into the base plate GP, where the connection pins AS may be seated firmly by means of the harpoon shape.

The outwardly pointing end of the connection pins AS is also configured in such a way that it can be pressed without solder into a printed circuit board (not represented in the figure). To this end, for example, the end of the connection pins is shaped as a compressible eyelet, which can expand again inside the printed circuit board so that firm seating of the connection pins AS is also ensured in the printed circuit board.

In the embodiment represented, the leaf spring FE may be metallic and, for example, produced by stamping. In the middle, the leaf spring FE comprises a corresponding recess, through which the sensor element is fitted. The sleeve may also be fitted through the recess of the leaf spring FE. The leaf spring may, however, also comprise a holder for the carriage SC in the direction of the carriage, which allows subsequent fastening of the leaf spring BF on the carriage SC and/or of the sleeve HS on the carriage SC.

The sensor element SE may also be configured as a thermocouple or as an ohmic resistor element. Corresponding evaluation circuits for the sensor element SE may be configured in an external circuit environment, in particular on the printed circuit board into which the sensor SR is fitted. The component parts of the housing, i.e. the base plate GP, the spacer ring AR and the cover cap KP may be produced by plastic or ceramic injection molding. The electrical contacting on the printed circuit board may also be carried out by means of a solder connection (THT or SMT), although a solder-free plug-in connection is preferred, which may for example correspond to DIN EN 60352-4. All the constituents of the sensor SR are configured in such a way that straight-line mounting in plug-in design is possible. Before the assembly of the housing components, the sensor element may be fastened on the connection pins AS in the base plate GP, where they are freely accessible because of the flat design of the base plate GP. The remaining parts are simply mounted by fitting onto the base plate GP in the deflection direction AL. In the assembled housing, the carriage is pre-stressed while bearing on the lower stop AG2 under a pre-stress of the leaf spring FE, which on the upper stop AG.

A sensor according to the invention may also be formed in a different geometrical configuration, in which case the housing and the carriage may for example comprise more than the embodiments represented. In particular, a greater number of latch elements may be used. The latch elements may also be configured in such a way that they engage externally around the base plate and can latch in above the base plate. Other embodiments of latch elements and corresponding recesses are also possible.

LIST OF REFERENCES

AG stop
AS connection pins
$AS_A$, $AS_I$ outwardly and inwardly pointing sections of the AS
BF leaf spring
BW bonding wires
DR spacer ring
FE spring element
FG guide
GH housing
GP base plate
HS sleeve with closed end
KP cover cap
RA recess for latch element on the base plate
RE latch element
SE sensor element
SL carriage
SR sensor

The invention claimed is:

1. A sensor for measuring a parameter at a measurement point of a surface by means of direct contact, comprising
a sensor element arranged movably in the sensor,
a spring element which can resiliently absorb an application force with which the sensor element is pressed against the measurement point,
a base plate having connection pins,
a cover cap seated on the base plate,
a carriage on which the sensor element and the spring element are fastened,
the base plate and the cover cap forming a housing which receives and encloses the carriage together with the spring element,
bonding wires which electrically connect the sensor element to the connection pins,
wherein the carriage is fastened by means of the spring element in the sensor with a pre-stress in such a way that the carriage and therefore the sensor element can move against the pre-stress in the direction of the base plate,
wherein the spring element is configured as a leaf spring with two ends, both of which protrude laterally from the carriage,
wherein the two ends of the leaf spring bear on a stop in the housing, and
wherein the carriage and the sensor element fastened thereon pressed in the direction of the base plate against the stop.

2. The sensor according to claim 1,
wherein the cover cap comprises a guide, in which the carriage is guided in such a way that it can move in the direction of the base plate and back.

3. The sensor according to claim 1,
wherein the carriage comprises a sleeve, which has a closed end and in which the sensor element is arranged and fastened,
wherein the cover cap comprises an opening through which the closed end, facing away from the base plate, of the sleeve is fed.

4. The sensor according to claim 3,
wherein the sensor element is an NTC-based temperature sensor,
wherein the sensor element is fitted into the sleeve and is encapsulated there with an encapsulation compound.

5. The sensor according to claim 3,
wherein the sleeve is formed from metal,
wherein the base plate, carriage, cover cap and optionally spacer ring are formed as an injection-molded part from a filled or unfilled plastic.

6. The sensor according to claim 1,
wherein the cover cap comprises latch elements, with which it is latched in corresponding recesses of the base plate.

7. The sensor according to claim 6,
wherein the base plate is configured as a flat plate,
wherein a spacer ring, which forms a segment of the housing, is inserted between the cover cap and the base plate, the latch elements engaging through the spacer ring so that the latter is held between the cover cap and the base plate, a stop for the ends of the leaf spring being formed on the spacer ring.

8. The sensor according to claim 1,
wherein the connection pins are pressed into the base plate and pass through the latter, so that they comprise a section pointing inward and a section pointing outward, the latter being provided in order to connect the sensor to a circuit environment.

9. The sensor according to claim 1,
wherein the bonding wires of the sensor element are laterally curved outward.

10. A sensor for measuring a parameter at a measurement point of a surface by means of direct contact, comprising
a sensor element arranged movably in the sensor,
a spring element which can resiliently absorb an application force with which the sensor element is pressed against the measurement point,
a base plate having connection pins,
a cover cap seated on the base plate,
a carriage on which the sensor element and the spring element are fastened,
the base plate and the cover cap forming a housing which receives and encloses the carriage together with the spring element, and
bonding wires which electrically connect the sensor element to the connection pins,
wherein the carriage is fastened by means of the spring element in the sensor with a pre-stress in such a way that the carriage and therefore the sensor element can move against the pre-stress in the direction of the base plate, and
wherein the cover cap comprises latch elements, with which it is latched in corresponding recesses of the base plate.

11. A sensor for measuring a parameter at a measurement point of a surface by means of direct contact, comprising
a sensor element arranged movably in the sensor,
a spring element which can resiliently absorb an application force with which the sensor element is pressed against the measurement point,
a base plate having connection pins,
a cover cap seated on the base plate,
a carriage on which the sensor element and the spring element are fastened,
the base plate and the cover cap forming a housing which receives and encloses the carriage together with the spring element, and
bonding wires which electrically connect the sensor element to the connection pins, wherein the carriage is fastened by means of the spring element in the sensor with a pre-stress in such a way that the carriage and therefore the sensor element can move against the pre-stress in the direction of the base plate, and wherein the connection pins are pressed into the base plate and pass through the latter, so that they comprise a section pointing inward and a section pointing outward, the latter being provided in order to connect the sensor to a circuit environment.

* * * * *